United States Patent
Räsänen

(10) Patent No.: US 6,647,006 B1
(45) Date of Patent: Nov. 11, 2003

(54) HIGH-SPEED DATA TRANSMISSION IN A MOBILE SYSTEM

(75) Inventor: Juha Räsänen, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/501,070

(22) Filed: Feb. 9, 2000

Related U.S. Application Data

(63) Continuation of application No. PCT/FI99/00502, filed on Jun. 9, 1999.

(30) Foreign Application Priority Data

Jun. 10, 1998 (FI) .................................................. 981333

(51) Int. Cl.$^7$ .................................. H04J 3/00; H04J 3/02
(52) U.S. Cl. ........................ 370/345; 370/528; 370/542; 455/560
(58) Field of Search .................................. 370/328–329, 370/335, 349, 337, 468, 528–529, 535–538, 542, 545, 345; 455/340–452, 560–561

(56) References Cited

U.S. PATENT DOCUMENTS

| | | | | |
|---|---|---|---|---|
| 5,901,143 A | * | 5/1999 | Rotter et al. | 370/329 |
| 6,128,322 A | * | 10/2000 | Rasanen et al. | 370/468 |
| 6,172,968 B1 | * | 1/2001 | Rasanen | 370/329 |
| 6,400,954 B1 | * | 6/2002 | Khan et al. | 455/450 |

FOREIGN PATENT DOCUMENTS

| | | |
|---|---|---|
| WO | WO 96/27959 | 9/1996 |
| WO | WO 96/27960 | 9/1996 |
| WO | WO 98/18244 | * 4/1998 |
| WO | WO 98/21840 | 5/1998 |
| WO | WO 99/59358 | 11/1999 |

OTHER PUBLICATIONS

M. Mouly and M. Pautet; *The GSM System for Mobile Communications*, Palaiseau, France, 1992, ISBN:2–9507190–0–7.
Search Report for PCT/FI99/00502.

* cited by examiner

Primary Examiner—Steven Nguyen

(57) ABSTRACT

A channel configuration of a digital mobile system comprises two or more lower-rate transmission channels for each high-speed radio interface traffic channel at the network interface between a base station and an interworking function. Radio frames, such as EDGE frames, are transferred on a radio interface traffic channel. Transmission frames, such as TRAU frames, are transferred on transmission channels. The total data rate at the network interface is greater than the data rate at the radio interface. According to the invention, the total data rates of the network interface and the radio interface are rate-adapted by transferring fill data in transmission frames in addition to payload between the base station and the interworking function, such that the average data rate of the payload at the network interface corresponds to the total data rate at the radio interface, and the combined total data rate of the fill data and the payload corresponds to the total data rate at the network interface.

12 Claims, 3 Drawing Sheets

HIGH-SPEED DATA TRANSMISSION IN A MOBILE SYSTEM

This application is a continuation of application No. PCT/FI1999/00502 Jun. 9, 1999.

FIELD OF THE INVENTION

The invention relates to high-speed data transmission in mobile communications systems, especially when a multichannel configuration is used.

BACKGROUND OF THE INVENTION

In mobile systems, the transmission capacity available at the radio interface is divided among a plurality of users according to a multiple access principle. The most commonly used multiple access schemes include time division multiple access (TDMA), code division multiple access (CDMA) and frequency division multiple access (FDMA). In TDMA systems, communication over a radio path takes place on a time division basis in successive recurrent TDMA frames, each of which comprises several time slots. A short information packet is transmitted in each time slot in the form of a radio-frequency burst of a limited duration, consisting of a number of modulated bits. The time slots are mainly used for conveying control channels and traffic channels. Traffic channels are used for transmitting speech and data, whereas control channels are used for signalling between a base station and mobile stations. An example of a TDMA radio system is the pan-European mobile system GSM (Global System for Mobile Communications).

In a CDMA system, a traffic channel is determined by a unique spreading code assigned to a mobile station, whereas in an FDMA system a traffic channel is determined by a radio channel.

Maximum data transfer rate on a single traffic channel is limited to a rather low level according to the available bandwidth and the channel coding and error coding used in the transmission. For example, in the GSM system the user data rate of a traffic channel employing one time slot was limited to 9.6 kbit/s according to the original specifications, and the radio interface rate was 12 kbit/s. However, this has been found insufficient for many of the new teleservices, such as telefax, video transmission etc., wherefore new mobile systems are being provided with high-speed data transmission services based on so-called multichannel technology. In multichannel technology, a mobile station is provided with a higher bit rate and a greater bandwidth by means of several parallel basic traffic channels (e.g. several time slots). For example in the GSM mobile system, high-speed data service HSCSD (High Speed Circuit Switched Data) is defined in recommendations GSM 01.34, GSM 02.34 and GSM 03.34 of the ETSI (European Telecommunications Standards Institute). In the HSCSD concept, a high-speed data signal is divided into separate data streams, which are then transferred via N subchannels (N traffic channel time slots) at the radio interface and, correspondingly, via N subchannels between the base station and the mobile services switching centre (transcoder). After the data streams have been divided, they are transferred on the subchannels as if they were mutually independent until they are combined at the receiving end. However, logically these N subchannels are parts of the same HSCSD connection, in other words they form one HSCSD traffic channel. The capacity of an HSCSD traffic channel is thus almost eightfold compared to the capacity of a basic traffic channel, which considerably improves the data transfer rate.

The GSM HSCSD is capable of supporting a radio interface rate of 96 kbit/s (8×12 kbit/s) and user rates of up to 64 kbit/s and 76.8 kbit/s (8×9.6 kbit/s) at the radio interface.

The aim of the EDGE (Enhanced Data Rates for GSM Evolution) project of the ETSI is to develop a new modulation method providing a higher data rate per time slot than the present GMSK modulation, while retaining the channel spacing of 200 kHz and the TDMA frame structure. This enables supporting the present HSCSD data services with a lower number of time slots. The new modulation method also makes it possible to provide new data services with a data rate that may be as high as 64 kbit/s per time slot or over 64 kbit/s (n*64 kbit/s) in a multislot constellation. According to the present alternative modulation methods, the radio interface rate is either 28.8 kbit/s or 38.4 kbit/s on a single channel.

As a result of the new modulation method of the EDGE, the traffic channel data rate at the radio interface and the traffic channel data rate between a base station and an interworking function (usually located remote from the base station at a mobile services switching centre) are no longer directly compatible or adapted one-to-one, unless entirely new rate adaptation functions are defined between the base station and the interworking function.

The EDGE project suggests several new alternative solutions for this problem. One alternative is to define completely new rate adaptation functions, optimized for the EDGE, between the base station and the interworking function. Another alternative manner is to use existing TRAU formats and physical 16 kbit/s channel structures at an Abis interface. An advantage of the latter alternative is that an EDGE radio interface does not require changes in the Abis interface and the TRAUs. Since data rates exceeding 14.4 kbit/s cannot be rate-adapted into one 14.4 kbit/s TRAU frame, TRAU frames of several Abis transmission channels must be used to provide the higher capacity required by the EDGE radio interface. In this case, the base station must process a higher number of Abis transmission channels than the number of time slots used at the EDGE radio interface, which makes the base station more complex. For example, one time slot (channel) at the EDGE radio interface (28.8 kbit/s) would require two Abis transmission channels with a 14.4 kbit/s TRAU format. Correspondingly, two 28.8 kbit/s EDGE channels (57.6 kbit/s multichannel configuration) would require four Abis transmission channels. The EDGE project does not suggest the use of the present 14.4 kbit/s Abis rate adaptations with a 38.4 kbit/s EDGE channel, which results in a more problematic situation. The problem is due to the fact that a 38.4 kbit/s EDGE channel typically requires three Abis transmission channels or 3*14.4=43.2 kbit/s for each EDGE channel, whereupon the data rates at the network interface and at the radio interface are incompatible.

SUMMARY OF THE INVENTION

An object of the invention is to simplify the operation and structure of a base station in a mobile system which requires a higher number of transmission channels than traffic channels, and where the total data rates at the radio interface and at the network interface are different.

The invention relates to a method according to claim 1, a mobile system according to claim 10 and a base station according to claim 12.

Each high-speed traffic channel at the radio interface requires two or more lower-rate transmission channels between the base station and the interworking function (network interface), which is typically located at the mobile services switching centre. Radio frames, such as EDGE frames, are transmitted over a radio interface traffic channel. Network interface transmission channels are used for transferring transmission frames, such as TRAU frames. The total data rate at the network interface is higher than the data rate at the radio interface. According to the invention, the total data rates of the network interface and the radio interface are rate-adapted by transferring also fill data in addition to payload in transmission frames between a radio access network element, such as a base station, and the interworking function. In such transmission the average payload data rate at the network interface corresponds to the total data rate at the radio interface, and the combined total data rate of the fill data and the payload corresponds to the total data rate at the network interface. In the uplink direction, the base station inserts the fill data into the transmitted transmission frames and the interworking function removes it as unnecessary from the received transmission frames before the payload is processed further. In the downlink direction, the interworking function inserts the fill data into the transmitted transmission frames and the base station removes it from the received transmission frames before the payload is transmitted in radio frames to the mobile station. In some cases the aforementioned radio access network element may also be some other unit than a base station, for example a radio network controller in a UMTS network.

Due to the invention, for example a 38.4 kbit/s EDGE channel can be adapted in a simple manner to three 14.4 kbit/s Abis channels even though the total data rates are incompatible. Basically the method only comprises manipulating the content of the information to be transmitted, and the method is only visible to the base station and the interworking function which insert and discard the fill data. Therefore the invention does not require any other changes at the radio interface or the network interface, nor does it restrict their further development in any way.

The invention is applicable for both transparent and non-transparent data transmission. However, it is preferable in transparent data transmission that fill data is inserted into the data stream as evenly as possible in order to minimize the variation in transmission delays.

BRIEF DESCRIPTION OF THE DRAWINGS

In the following, the invention will be described in greater detail in connection with preferred embodiments with reference to the accompanying drawings, in which.

PREFERRED EMBODIMENTS OF THE INVENTION

Figure 1A:
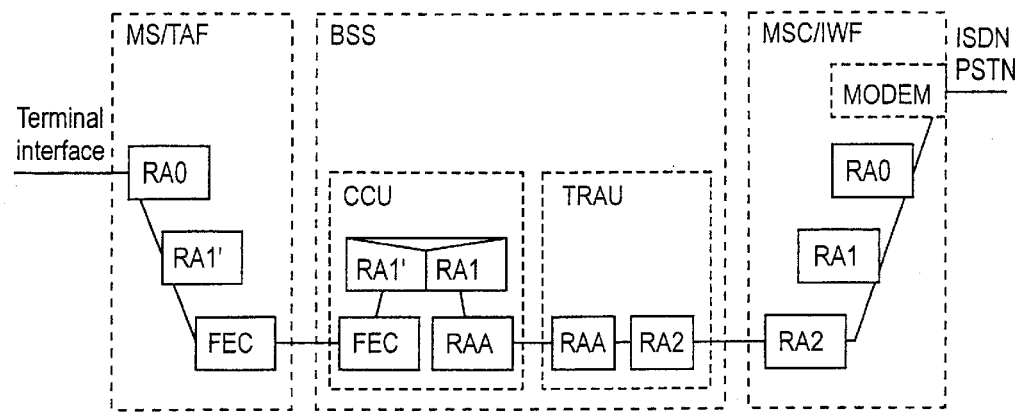
FIGS. 1A and 1B show a protocol structure for transparent and non-transparent traffic channels TCH/F4.8 and TCH/F9.6, respectively, in a GSM system.

The present invention can be applied in all digital wireless telecommunication systems, such as cellular systems, WLL-type (Wireless Local Loop) and RLL-type (Radio Local Loop) networks and satellite-based mobile communications systems, among others, to introduce a new high-speed traffic channel at the radio interface without a need to define new rate adaptations for the transmission connections. In this connection the term 'mobile communications system' (or network) refers generally to all wireless telecommunication systems. There are several multiple access modulation techniques that facilitate communication with a plurality of mobile users. These techniques include time division multiple access (TDMA), code division multiple access (CDMA) and frequency division multiple access (FDMA). The physical concept of a traffic channel varies in different multiple access methods, and it is primarily defined by means of a time slot in TDMA systems, a spreading code in CDMA systems, a radio channel in FDMA systems, a combination of the former, etc. The basic idea of the present invention is independent of the type of the traffic channel and the multiple access method used.

The primarily field of application of the invention is the introduction of an EDGE radio interface into a GSM system or a corresponding change in other GSM-based systems, such as DCS1800 (Digital Communication System) and the US digital cellular system PCS (Personal Communication System), and in WLL systems based on the aforementioned systems. The invention will be described below by using as an example the GSM mobile system. The structure and operation of the GSM system are well known to those skilled in the art and they are defined in the GSM specifications of the ETSI (European Telecommunications Standards Institute). Reference is also made to *The GSM System for Mobile Communications*, M. Mouly & M. Pautet, Palaiseau, France, 1992, ISBN:2-9507190-0-7.

The basic structure of the GSM system comprises two parts: a base station system BSS and a network subsystem NSS. The BSS and mobile stations MS communicate via radio connections. In the base station system, each cell is served by a base station BTS. A number of base stations are connected to a base station controller BSC, which controls the radio frequencies and channels used by the BTS. The BSCs are connected to a mobile services switching centre MSC. Certain MSCs are connected to other telecommunication networks, such as the public switched telephone network PSTN, and they comprise gateway functions for calls bound for and arriving from these networks. These MSCs are known as gateway MSCs (GMSC). There are also at least two databases: a home location register HLR and a visitor location register VLR.

A mobile system comprises adapter functions for adapting an intranetwork data link to protocols used by terminal equipments and other telecommunication networks. The adapter functions typically include a terminal adaptation function TAF placed at the interface between a mobile station and a data terminal equipment DTE connected thereto, and an interworking function IWF situated at the interface between the mobile network and another telecommunication network, usually in connection with an MSC. An MSC typically comprises several different types of adapter equipment pools for supporting different data services and protocols, such as a modem pool with modems and facsimile adapters for modem and facsimile services, a UDI/RDI rate adapter pool, etc. In the GSM system a data link is set up between a TAF of the MS and an IWF in the mobile network. The TAF adapts a data terminal equipment connected to the MS to the aforementioned GSM data link that is set up over a physical connection using one or several traffic channels. The IWF connects the GSM data link to another network, such as an ISDN, another GSM network or a PSTN.

As described above, modern mobile systems support different teleservices and bearer services. The bearer services in the GSM system are defined in the GSM specification 02.02 and the teleservices are defined in the GSM specification 02.03. The bearer services are usually divided into groups according to a property, for example asynchronous and synchronous bearer services. Each of these groups comprises a number of bearer services, such as a transparent service (T) and a non-transparent service (NT). In a transparent service the data to be transmitted is unstructured and transmission errors are only corrected by means of channel coding. In a non-transparent service, the data to be transmitted is structured into protocol data units (PDU), and transmission errors are corrected by using (in addition to channel coding) automatic retransmission protocols.

FIG. 1A shows an example of protocols and functions required in an IWF (either in an MSC or a WLL-specific network element) for transparent bearer services. A transparent circuit switched connection between a TAF and an IWF on a GSM traffic channel comprises several protocol layers that are common to all these services. They include different rate adaptation RA functions, such as RA1' between the TAF and a channel codec unit CCU located in the BSS, RA1 between the CCU and the IWF, RAA between the CCU and a transcoder unit TRAU located remote from the base station, and RA2 between the TRAU and the IWF. The rate adaptation functions RA are defined in the GSM recommendations 04.21 and 08.20. Communication between the CCU and the TRAU is defined in the GSM recommendation 08.60. Information that has been RA1' rate-adapted at the radio interface is also channel-coded as defined in the GSM recommendation 5.03, which is illustrated by blocks FEC in the MS and the CCU. The IWF and the TAF also comprise higher-level protocols that are specific to each service. In an asynchronous transparent bearer service shown in FIG. 1A, the IWF requires asynchronous-to-synchronous conversion RA0 and a modem or a rate adapter towards the fixed network. A transparent signal propagates through the traffic channel between the terminal interface and the PSTN/ISDN. A transparent synchronous configuration is otherwise identical but it has no rate adaptation RA0.

Figure 1B:
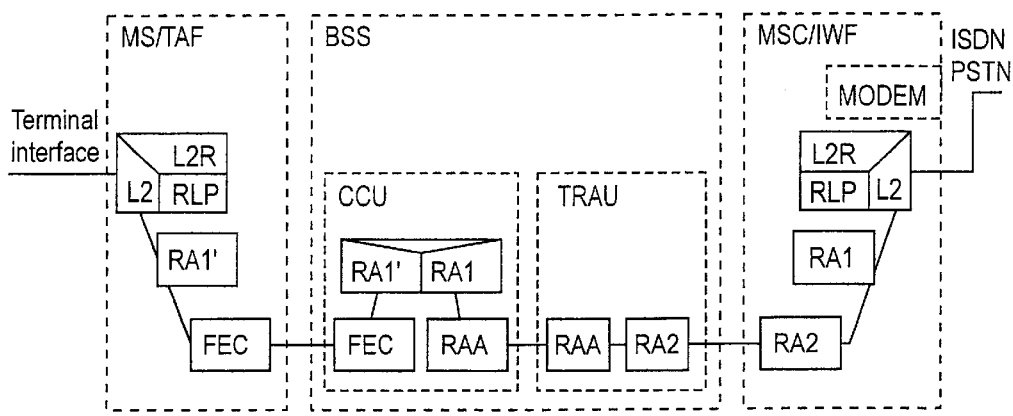
Figure 2:
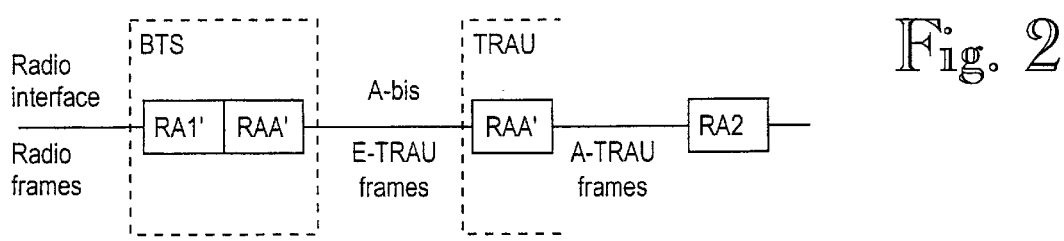
FIG. 2 shows Abis interface protocols for traffic channel TCH/F14.4.

With reference to FIG. 1B, in an asynchronous non-transparent bearer service the IWF and the MS comprise, instead of RA0, L2R (Layer 2 Relay) and RLP (Radio Link Protocol) protocols. The L2R functionality for non-transparent character-oriented protocols is defined, for example, in the GSM recommendation 07.02. The RLP is defined in the GSM recommendation 04.22. The RLP is a frame-structured, balanced (HDLC-type) data transmission protocol, where error correction is based on retransmission of distorted frames at the request of the receiving party. The interface between the IWF and, for example, an audio modem MODEM is as defined in CCITT V.24 and it is denoted by L2 in FIG. 1B. This non-transparent configuration is also used in accessing the Internet.

Figure 3:
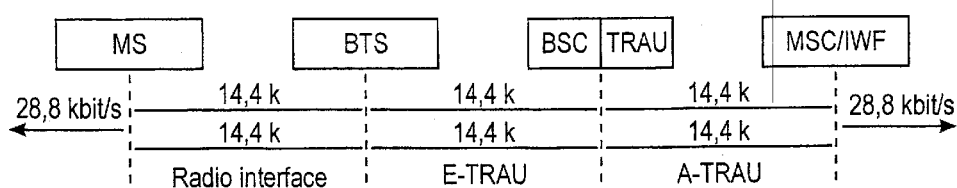
FIG. 3 illustrates a TCH/F14.4 multichannel configuration in the GSM.

FIGS. 1A and 1B relate to a network configuration where the transcoder and some of the rate adaptations are situated outside the BTS in a so-called remote transcoder TRAU. The transcoder is operationally a part of the BSC. Physically the TRAU may be located either in the BSC or the MSC. The interface between the TRAU and the BTS is called an Abis interface. The Abis interface comprises 16 kbit/s traffic channels, four of which can be transmitted on a single standard 64 kbit/s channel. Information is transmitted between the CCU and the TRAU in fixed-length frames called TRAU frames. In these frames are transmitted both speech/data and control signals related to the TRAU. In case of channel coding of 4.8 kbit/s (TCH/F4.8) and 9.6 kbit/s (TCH/F9.6), when data is adapted to TRAU frames a rate adaptation function RA1/RAA is required in addition to the other rate adaptations. With the channel coding of 14.4 kbit/s (TCH/F14.4), a slightly different rate adaptation function RA1'/RAA' is required, as illustrated in FIG. 3. RA1'/RAA' converts the radio frames (blocks) into an E-TRAU format, and vice versa. The RAA' function converts the E-TRAU frame into an A-TRAU frame, and vice versa. Since the rate adaptation determined for TCH/F14.4 channel coding is obviously the best alternative also for EDGE radio interface traffic channels, the preferred embodiment of the invention is described by means thereof. It should be noted, however, that the invention can also be implemented with other rate adaptations, such as RA1/RAA.

In the HSCSD concept in the GSM system, a high-speed data signal is divided into separate data streams, which are then transmitted via N subchannels (N traffic channel time slots) at the radio interface and via N transmission channels (16 kbit/s) between the BTS and the IWF. When the data streams have been divided, they are transferred in the subchannels as if they were mutually independent until they are combined in the IWF or the MS. However, logically these N subchannels are parts of the same HSCSD connection, in other words they form one HSCSD traffic channel. According to the GSM recommendations, data streams are divided and combined in a modified RA0 or RLP, which is thus common to all the subchannels. Below this common RA0 or RLP, each subchannel comprises separately the same protocol stack RA1'-FEC-FEC-RA1'-RAA-RAA-RA2-RA2-RA1 or RA1'-FEC-FEC-RA1'-RAA'-RAA'-RA2-RA2-RA1, which is shown in FIGS. 1A and 1B for one traffic channel between the MS/TAF and the MSC/IWF. In transparent data transmission between the TAF and the IWF, the traffic channels are numbered in order to maintain the order of the data. Further, superframing is used within a traffic channel to increase the tolerance towards differences in transmission delays between the traffic channels. The channel and frame numbering is transmitted in the form of inband signalling.

FIG. 3 illustrates a multichannel configuration according to the GSM recommendations for TCH/F14.4 channel coding. An HSCSD traffic channel of 28.8 kbit/s comprises two parallel 14.4 kbit/s channels between the MS and the MSC/IWF.

If an EDGE radio interface rate of 28.8 or 38.4 kbit/s is to be supported with the present channel structures and TCH/F14.4 rate adaptations between the BTS and the IWF, the result will be, for example, such channel configurations as shown in FIGS. 4A to 4G in single-slot and multislot cases. Each 28.8 kbit/s EDGE channel requires two 14.4 kbit/s channels between the BTS and the MSC. Correspondingly, each 38.4 kbit/s EDGE channel requires three 14.4 kbit/s channels between the BTS and the MSC. Therefore the number of transmission channels is higher than the number of radio interface traffic channels, which differs from a conventional GSM channel configuration. A BTS must be implemented with a more complicated structure than previously in order that it is capable of performing the required conversions and adaptations between the radio interface and the Abis interface. Another requirement is the maintenance of the order of data when the data is transmitted via several parallel transmission channels. This requirement is particularly challenging when the radio interface also has a multichannel configuration. One possible method of maintaining the order of data is disclosed in a co-pending Finnish Patent Application 981,043, which is incorporated herein by reference. At the radio interface it is possible to use internal timing of the radio system (e.g. time slot numbering) to maintain the order of data, in which case no separate frame or channel numbering is needed at the radio interface for this purpose. However, maintaining the order of data in multichannel transmission is not essential for the present invention, wherefore it will not be described in greater detail herein.

When a 28.8 kbit/s EDGE channel is used, the total data rate at the radio interface is always a multiple of the 14.4 kbit/s Abis channel, in other words the radio interface and the network interface can easily be provided with equal data rates, as shown in FIGS. 4A to 4D. When a 38.4 kbit/s EDGE channel is used, the total data rates at the radio interface and at the network interface are not equal, except for the configuration of FIG. 4G. Therefore at least the configurations shown in FIGS. 4E and 4F require an additional rate adaptation. This rate adaptation can be performed in the invention by transferring fill data in TRAU frames between the BTS and the IWF.

Figure 4A:
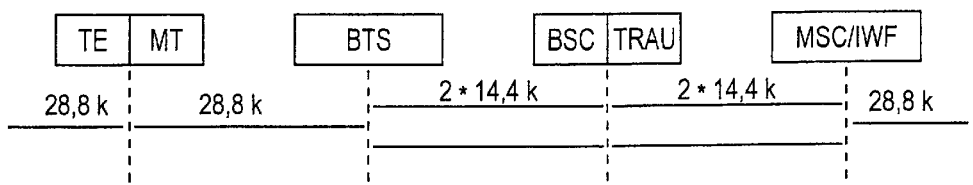
FIGS. 4A to 4G illustrate different channel configurations when the present 14.4 kbit/s TRAU frames and an EDGE radio interface are used.
Figure 4B:
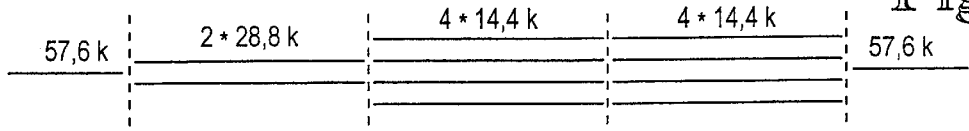
Figure 4C:
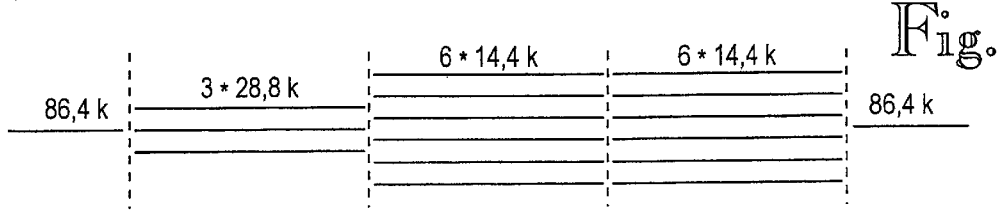
Figure 4D:
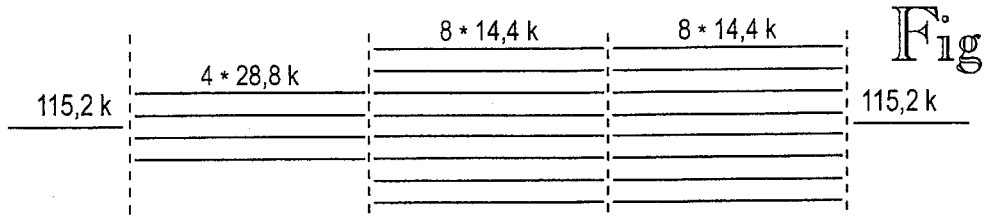
Figure 4E:
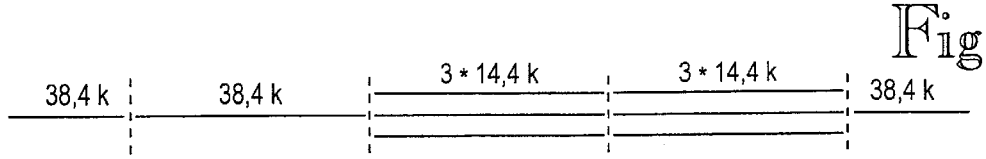
Figure 4F:
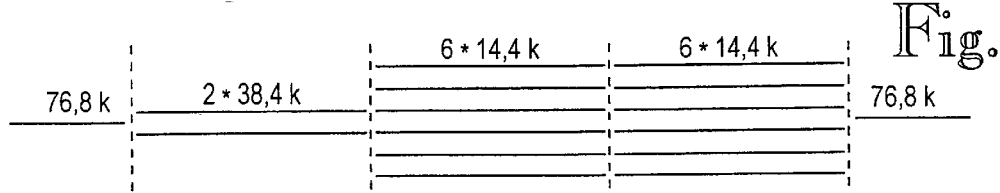
Figure 4G:
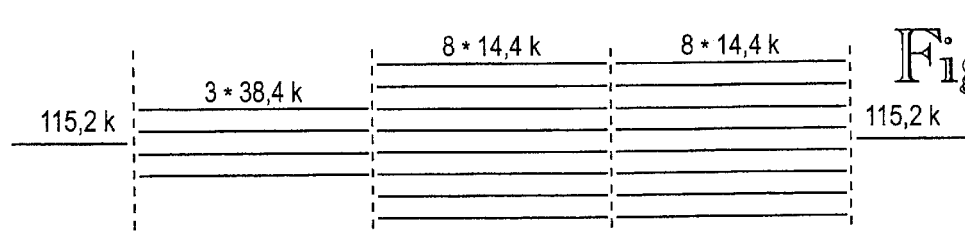

In the following, the invention will be described in greater detail by means of examples where it is assumed that a call has a channel configuration as shown in FIG. 4E, i.e. one 38.4 kbit/s EDGE traffic channel at the radio interface and three GSM TCH/F14.4 channels (43.2 kbit/s) between the BTS and the IWF.

Non-transparent Data Transmission from MS to IWF

Consider first non-transparent data transmission in the uplink direction. An MS transmits RLP frames over an EDGE channel in EDGE frames at a nominal data rate of 38.4 kbit/s. The BTS rate-adapts the received RLP frames into a 43.2 kbit/s Abis interface and inserts the RLP frames into E-TRAU frames. In other words, the BTS transmits meaningless fill data in an E-TRAU frame if no RLP frames are available at the moment of transmission due to the lower data rate of the MS-BTS leg compared to the BTS-TRAU leg. In the preferred embodiment of the invention, the following method is used to maintain the ratio between the RLP frames and the E-TRAU frames. If no RLP frame (or a fraction of an RLP frame if the RLP frame is longer than the E-TRAU frame) can be received from the MS to fill the next frame to be transmitted, an E-TRAU frame that only contains fill data is transmitted. The fill data may consist, for example, of an intentionally corrupted or invalid RLP frame, which is then discarded by the receiving RLP unit. The fill data may also consist of an "empty" E-TRAU frame which is denoted as a fill frame by means of status and control bits, for example. The RLP frame(s) received simultaneously with the transmission of a fill frame towards the IWF is (are) buffered and transmitted in the next possible E-TRAU frame.

The remote transcoder TRAU adapts the E-TRAU frames to A-TRAU frames according to the GSM recommendations. The IWF discards the fill data possibly received in the A-TRAU frames. It may thus discard even an entire A-TRAU frame or RLP frame. Otherwise the IWF operates similarly as in a conventional multichannel TCH/F14.4 call.

Figure 5:
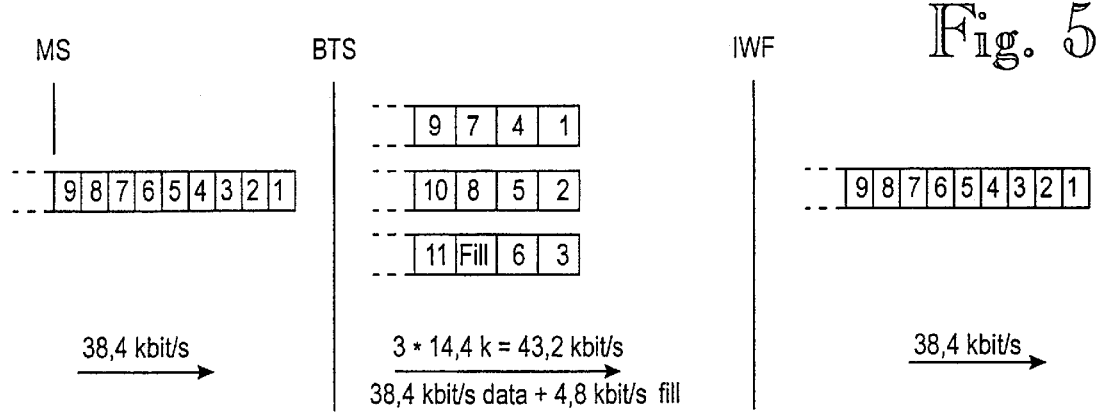
FIGS. 5, 6 and 7 illustrate the rate adaptation according to the invention by means of fill data.
Figure 6:
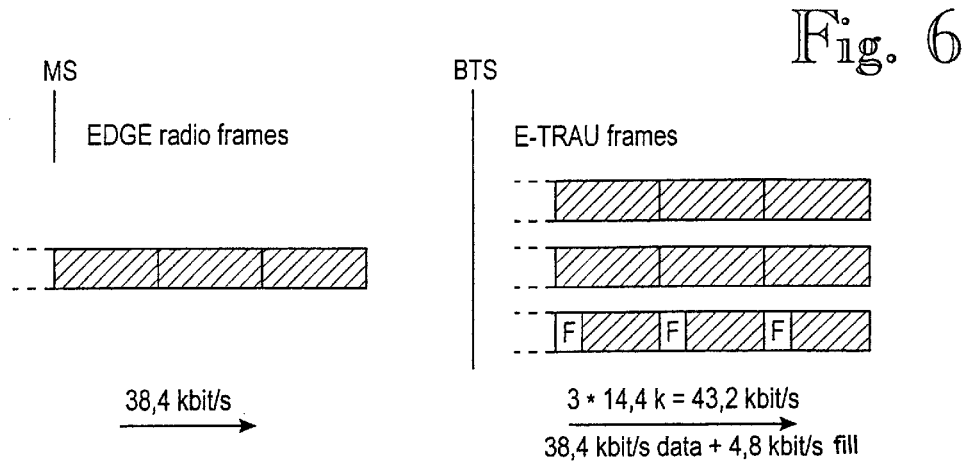

The data transmission according to the invention is illustrated in FIGS. 5 and 6. In FIG. 5, RLP frames 1 to 11 are transmitted with three Abis channels, and the difference in data rates is adapted by transmitting fill frames FILL.

Non-transparent Data Transmission from IWF to MS

In the downlink direction the MSC/IWF builds the RLP frames and inserts them in A-TRAU frames similarly as in a conventional multichannel TCH/F14.4 call, except that since the data rate on the MS-BTS leg differs from the data rate on the BTS-TRAU leg, the IWF rate-adapts the RLP frames to the BTS-TRAU leg. In other words, the IWF transmits fill data in an A-TRAU frame if no RLP frames can be transmitted at the moment due to the lower data rate on the BTS-MS leg. Continuous transmission of RLP frames would cause buffer overflow and loss of data in the BTS. In the preferred embodiment of the invention, the following method is used to maintain the ratio of the RLP frames and the A-TRAU frames. The IWF maintains the average data rate over the IWF-BTS leg, which corresponds to the data rate on the BTS-MS leg, by transmitting at times A-TRAU frames that only contain fill bits (no RLP frames). The need for transmitting fill data can be calculated from the difference between the total data rates of the radio interface and the network interface. For example, 43.2−38.4=4.8 kbit/s, in which case every ninth A-TRAU frame is a fill frame.

The remote transcoder TRAU adapts the A-TRAU frames to E-TRAU frames according to the GSM recommendations. The BTS discards the fill data possibly received in the E-TRAU frames. It may even discard an entire E-TRAU frame or RLP frame. The BTS inserts the received RLP frames into EDGE radio frames and transmits them via an EDGE channel to the MS.

Transparent Data Transmission from MS to IWF

The MS transmits the data and the status and control bits in radio frames of the EDGE radio interface via an EDGE channel to the BTS. If more than one EDGE channel is used at the radio interface, the MS may also transmit subchannel and/or frame numbering to restore the order of the data. Numbering is not needed if the timeslot/channel numbering of the radio system is used for the same purpose.

The BTS receives the radio frames. If more than one EDGE channel is used, the BTS compensates for possible differences in transmission times on different EDGE channels by buffering the data received from the different EDGE channels and by restoring the original order of the data by means of the aforementioned channel numbering or intra-system timing. The BTS may also forward the data without checking the order or without correcting the order in the manner disclosed in Finnish Patent Application 981,043.

Figure 7:
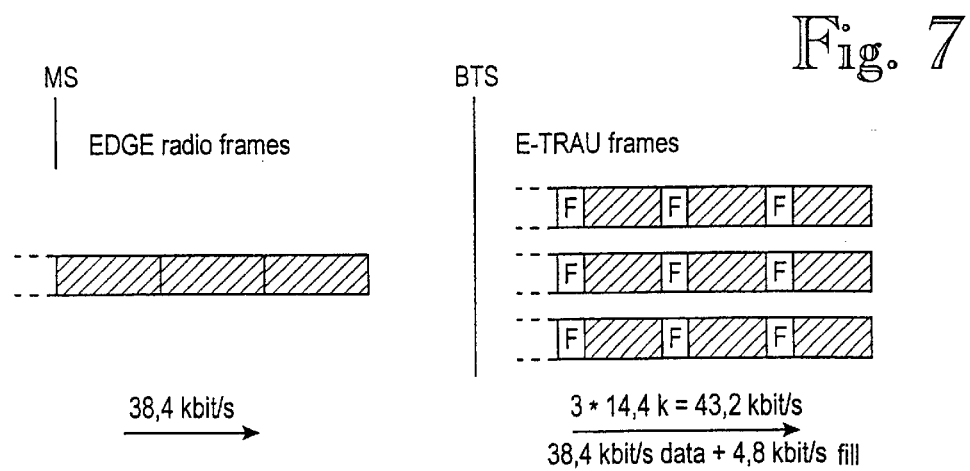

The BTS inserts the received data in E-TRAU frames, maps the status/control bits from the radio frames to the status/control bit positions of the E-TRAU frames, and inserts the channel and/or frame numbering of the transmission channels into the E-TRAU frames. The BTS also rate-adapts the total radio interface data rate (e.g. 38.4 kbit/s) to the total network interface data rate (e.g. 43.2 kbit/s). For example, the BTS transmits fill bits in addition to actual data in the E-TRAU frames of one of the Abis channels, and only data in the E-TRAU frames of the other Abis channels, as shown in FIG. 6. Alternatively, the BTS may transmit fill bits in each E-TRAU frame as shown in FIG. 7, so that the processing of the frames becomes easier at both the transmitting and the receiving end. Further, the BTS may also transmit, at suitable intervals, an E-TRAU frame containing only fill data, as described above with respect to the non-transparent transmission. However, this causes variation in the transmission delay, which should be minimized in transparent transmission.

The TRAU adapts the E-TRAU frames to A-TRAU frames according to the GSM recommendations. The IWF discards the fill data possibly received in the A-TRAU frames. Otherwise the IWF operates similarly as in a conventional multichannel TCH/F14.4 call, which means that it restores the original order of the A-TRAU frames on the basis of the frame and/or channel numbering, separates the data and the status/control information from the frames, and so forth. The result is the original high-speed data stream.

Transparent Data Transmission from IWF to MS

The IWF adapts 38.4 kbit/s transparent data to a 43.2 kbit/s network interface. In other words, fill data is transmitted in A-TRAU frames similarly as described above in the transmission direction from the MS to the IWF. The IWF also inserts the channel and/or frame numbering of the transmission channels into the A-TRAU frames.

The TRAU adapts the A-TRAU frames to E-TRAU frames according to the GSM recommendations. The BTS discards the fill data possibly received in the E-TRAU frames. The BTS compensates for possible differences in transmission times on different Abis channels by buffering the data received from the different channels and by restoring the original order of the data by means of the aforementioned frame and/or channel numbering. The BTS may also forward the data without checking its order or without correcting the order in the manner disclosed in Finnish Patent Application 981,043.

The BTS inserts the data from the received E-TRAU frames into radio frames on an EDGE channel(s). If several EDGE channels are used, the BTS may provide the radio frames with frame and/or channel numbering. The MS receives the radio frames from the radio interface. If more than one EDGE channel is used, the MS restores the order of the data by means of the aforementioned numbering or intrasystem timing. The result is the original high-speed data stream.

It is obvious for those skilled in the art that as the technology develops the basic idea of the invention can be implemented in various ways. The invention and the embodiments thereof are thus not restricted to the examples described above, but they may vary within the scope of the claims.

What is claimed is:

1. A data transmission method in a digital mobile communications system, the method comprising the steps of
    transferring data in radio frames via N traffic channels over a radio interface between a radio access network element, such as a base station, and a mobile station, a total data rate at the radio interface being N*S1, where N is an integer and S1 is a data rate of a single traffic channel,
    transferring data in transmission frames via M transmission channels over a network interface between the radio access network element and an interworking function, the total data rate at the network interface being M*S2, where M≧2N and S2 is a data rate of a single transmission channel and S2<S1 and M*S2>N*S1,
    rate-adapting the total data rates of the network interface and the radio interface by transferring fill data in addition to actual data in said transmission frames between the radio access network element and the interworking function, so that an average data rate at the network interface corresponds to a total data rate N*S1 at the radio interface, and the combined data rate of the fill data and the actual data corresponds to the total data rate M*S2 at the network interface.

2. A method according to claim 1, further comprising inserting, in the radio access network element, the fill data and the actual data of the radio frames in said transmission frames in the uplink direction,
    separating the fill data from the actual data as unnecessary in the interworking function before a payload is processed further,
    inserting, in the interworking function, the fill data and the actual data in transmission frames in the downlink direction,
    separating the fill data from the actual data in the radio access network element before the payload is transmitted in said radio frames to the mobile station.

3. A method according to claim 1, further comprising
    transferring data in said transmission frames on M-1 transmission channels,
    transferring actual data and fill data in said transmission frames on a single transmission channel.

4. A method according to claim 1, wherein said transfer of fill data comprises a step of
    transmitting at suitable intervals a transmission frame containing only fill data.

5. A method according to claim 1, further comprising transferring fill data in each transmission frame in addition to actual data.

6. A method according to claim 1, further comprising
    transferring radio link protocol frames between said mobile station and said interworking function in a non-transparent call,
    transferring the radio link protocol frames in the data field of said transmission frames at the network interface,
    transferring the radio link protocol frames in the data field of said radio frames at the radio interface,
    transmitting an uplink transmission frame that only contains fill data in the radio access network element if no radio link protocol frame or a fraction thereof, which would fill the transmission frame, is received from the radio interface,
    buffering, in the radio access network element, the radio link protocol frame(s) received simultaneously with the transmission of the transmission frame containing fill data to the interworking function,
    transmitting the buffered radio link protocol frame(s) in the next available transmission frame,
    discarding the fill data in the interworking function.

7. A method according to claim 1, further comprising
    transferring radio link protocol frames between said mobile station and said interworking function in a non-transparent call,
    transferring the radio link protocol frames in the data field of said transmission frames at the network interface,
    transferring the radio link protocol frames in the data field of said radio frames at the radio interface,
    transmitting fill data from the interworking function in transmission frames so that the average data rate at the network interface corresponds to the total data rate N*S1 at the radio interface,
    discarding the fill data in the radio access network element.

8. A method according to claim 1, wherein the fill data comprises one of the following: an intentionally corrupted or invalid radio link protocol frame, a transmission frame marked as a fill frame with control and status bits, fill bits in data-containing transmission frames.

9. A method according to claim 1, wherein a remote transcoder unit is provided between the radio access network element and the interworking function, the method comprising further steps of
    using transmission frames of a first type between said element and the remote transcoder,
    using transmission frames of a second type between the remote transcoder and the interworking function,
    converting the transmission frames of the first type into transmission frames of the second type, and vice versa, in the remote transcoder.

10. A digital mobile system where a channel configuration of a data call comprises N traffic channels at a radio interface between a base station and a mobile station, and M transmission channels between a radio access network element, such as a base station, and an interworking function, where N and M are integers and M≧2N, the data being transferred in transmission of frames on transmission channels and in radio frames on radio interface traffic channels, a total data rate at the radio interface being N*S1 and the total data rate at a network interface being M*S2, where S1 is a data rate of a single traffic channel and S2 is a data rate of a single transmission channel, and S2<S1 and M*S2>N*S1, the radio access network element and the interworking function being arranged to rate-adapt the total data rates of the network interface and the radio interface by transferring between said element and the interworking function fill data in said transmission frames in addition to actual data, so that an average data rate at the network interface corresponds to the total data rate N*S1 at the radio interface and a combined data rate of the fill data and the actual data corresponds to the total data rate M*S2 at the network interface.

11. A mobile system according to claim 10, wherein between said element and the interworking function there is a remote transcoder unit, and that the mobile system comprises transmission frames of a first type between the base station and the remote transcoder and transmission frames of a second type between the remote transcoder and the interworking function, and that the remote transcoder is arranged to convert the transmission frames of the first type into transmission frames of the second type, and vice versa.

12. A base station in a mobile system where a channel configuration of a data call comprises N traffic channels at a radio interface between said base station and a mobile station, and M transmission channels between the base station and an interworking function, where N and M are integers and M≧2N, the data being transferred in transmission frames on transmission channels and in radio frames on radio interface traffic channels, a total data rate at the radio interface being N*S1 and a total data rate at a network interface being M*S2, where S1 is a data rate of a single traffic channel and S2 is a data rate of a single transmission channel, and S2<S1 and M*S2>N*S1, said base station being arranged to rate-adapt the total data rates of the network interface and the radio interface by transferring between the base station and the interworking function fill data in said transmission frames in addition to actual data, so that an average data rate at the network interface corresponds to the total data rate N*S1 at the radio interface and the combined data rate of the fill data and the actual data corresponds to the total data rate M*S2 at the network interface.

* * * * *

UNITED STATES PATENT AND TRADEMARK OFFICE
CERTIFICATE OF CORRECTION

PATENT NO. : 6,647,006 B1
DATED : November 11, 2003
INVENTOR(S) : Räsänen

It is certified that error appears in the above-identified patent and that said Letters Patent is hereby corrected as shown below:

<u>Title page,</u>
Item [73], Assignee, should read -- [73] Assignee: Nokia Corporation --

Signed and Sealed this

Twenty-seventh Day of January, 2004

JON W. DUDAS
*Acting Director of the United States Patent and Trademark Office*